United States Patent
Navaskar et al.

(10) Patent No.: US 11,431,853 B2
(45) Date of Patent: Aug. 30, 2022

(54) SELECTIVE ENDPOINT NOTIFICATION OF AN INCOMING COMMUNICATION

(71) Applicant: Avaya Management L.P., Durham, NC (US)

(72) Inventors: Navanath Dattatray Navaskar, Pune (IN); Pragati Kailash Dhumal, Pune (IN)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/074,930

(22) Filed: Oct. 20, 2020

(65) Prior Publication Data

US 2021/0314444 A1   Oct. 7, 2021

(30) Foreign Application Priority Data

Apr. 3, 2020   (IN) .............................. 202011014868

(51) Int. Cl.
   *H04M 3/54*   (2006.01)
(52) U.S. Cl.
   CPC ..................................... *H04M 3/54* (2013.01)
(58) Field of Classification Search
   CPC combination set(s) only.
   See application file for complete search history.

(56) References Cited

U.S. PATENT DOCUMENTS

| | | | | |
|---|---|---|---|---|
| 2007/0121871 A1* | 5/2007 | Mullis | .................. | H04M 15/06 379/201.11 |
| 2007/0121894 A1* | 5/2007 | Noble, Jr. | ........... | H04M 3/5158 379/265.02 |
| 2009/0132307 A1* | 5/2009 | Messer | .................. | G06Q 10/10 705/1.1 |
| 2009/0304172 A1* | 12/2009 | Becerra | ............... | H04M 3/5166 379/211.01 |
| 2018/0191905 A1* | 7/2018 | McCoy | ................ | G06Q 30/016 |

* cited by examiner

*Primary Examiner* — Phung-Hoang J Nguyen

(57) ABSTRACT

The technology disclosed herein enables selective endpoint notification of incoming communications directed to a set of endpoints. In a particular embodiment, a method provides, in a communication control system, receiving a first request to establish a communication session with at least one endpoint in first set of endpoints. The first set of endpoints comprises two or more endpoints and the request is directed to the first set of endpoints. The method further provides identifying a first subset of the first set of endpoints based on application of one or more override rules to the first request. The override rules define conditions wherein fewer than all of the first set of endpoints should be notified of the first request. The method also provides notifying the first subset about the first request.

20 Claims, 8 Drawing Sheets

SELECTIVE ENDPOINT NOTIFICATION OF AN INCOMING COMMUNICATION

RELATED APPLICATIONS

This application claims the priority and benefit under 35 U.S.C. 119(a)-(d) to Foreign Application Serial No. 202011014868 filed in India entitled "SELECTIVE ENDPOINT NOTIFICATION OF AN INCOMING COMMUNICATION", on Apr. 3, 2020, which is herein incorporated in its entirety by reference for all purposes.

TECHNICAL BACKGROUND

Multi-endpoint communication services, such as bridging, multiple device access, and team, allow for multiple endpoints to be notified of an incoming notification. For example, a user may have multiple endpoints associated with the user for accepting incoming communications. When an incoming call is received by a control system that routes the call, the control system notifies all of the users' endpoints, which gives the user the option of choosing an endpoint to use when accepting the call. For instance, the user's cellphone and desk phone may both ring to notify the user of the incoming call. If the user is nearby both devices, then the user can choose a device for answering the call. Alternatively, if the user is not near one device or the other, the user will still be notified by the device which is near the user (e.g., by the cellphone when away from their desk). In other examples, the multiple endpoints may be associated with different users. For example, a team of users may all be tasked with handling incoming calls directed to a particular phone number (e.g., a help line number). Notifying each of the multiple endpoints of an incoming call may, therefore, allow any available user in the team to answer the call.

The above discussed services for notifying multiple endpoints of an incoming communication are typically an all or nothing type service. That is, the service is either activated for all the endpoints or it is not activated. However, there may be certain situations where a user of one of the endpoints does not want all endpoints to be notified of an incoming communication but also does not want to disable the service entirely so as to affect other incoming communications.

SUMMARY

The technology disclosed herein enables selective endpoint notification of incoming communications directed to a set of endpoints. In a particular embodiment, a method provides, in a communication control system, receiving a first request to establish a communication session with at least one endpoint in first set of endpoints. The first set of endpoints comprises two or more endpoints and the request is directed to the first set of endpoints. The method further provides identifying a first subset of the first set of endpoints based on application of one or more override rules to the first request. The override rules define conditions wherein fewer than all of the first set of endpoints should be notified of the first request. The method also provides notifying the first subset about the first request.

In some embodiments, the method provides establishing the communication session with a first endpoint in the first subset after notifying the first subset.

In some embodiments, notifying the first subset comprises transferring a communication session invite to each endpoint in the first subset. In those embodiments, in response to receiving the communication session invite, a first endpoint in the first subset may notify a first user of the first endpoint about the communication session invite.

In some embodiments, the method provides receiving at least a portion of the override rules from a first user. In those embodiments, the first user may be a user of a first endpoint in the first set of endpoints and the first endpoint may provide the first user with one or more predefined rule options, and wherein the first user selects at least one of the predefined rule options.

In some embodiments, a first rule of the override rules indicates that requests from a source endpoint of the first request should be directed to a first endpoint in the first set of endpoints. In those embodiments, identifying the first subset comprises including the first endpoint in the first subset. Also, in those embodiments, the source endpoint may be identified in the override rules based on a telephone number associated with the source endpoint.

In some embodiments, notifying the first subset comprises transferring a communication session invite to a first endpoint in the first subset and notifying endpoints in the first subset, other than the first endpoint, that the communication session invite is being transferred to the first endpoint.

In yet another embodiment, an apparatus is provided having one or more computer readable storage media and a processing system operatively coupled with the one or more computer readable storage media. Program instructions stored on the one or more computer readable storage media, when read and executed by the processing system, direct the processing system to receive a first request to establish a communication session with at least one endpoint in first set of endpoints. The first set of endpoints comprises two or more endpoints and the request is directed to the first set of endpoints. The program instructions further direct the processing system to identify a first subset of the first set of endpoints based on application of one or more override rules to the first request. The override rules define conditions wherein fewer than all of the first set of endpoints should be notified of the first request. The program instructions also direct the processing system to notify the first subset about the first request.

DETAILED DESCRIPTION

When using multi-endpoint services that notify multiple endpoints of incoming communications, there may exist situations where a user of one of the multiple endpoints does not want the other endpoints to be notified of an incoming communication. The user may not want the other endpoints to be notified for privacy reasons, continuity reasons (e.g., to ensure the user can continue a prior conversation via the incoming communication), expertise reasons (e.g., the user may have the expertise to handle a particular communication), or any other reason a user may have to wanting to restrict incoming communication notifications on other devices. Regardless of the reason, the implementations and scenarios described herein allow a user to place restrictions on the provision of a multi-endpoint service to endpoints associated therewith. The user may operate an endpoint to select various predefined options for how to limit incoming call notifications amongst the endpoints or may define limitations of their own. The limitations provided by the user override the notifications that would typically be provided to the endpoints by the multi-endpoint service and are, therefore, called override rules below. A control system for the multi-endpoint service, when implementing the override rules, will not notify all endpoints associated with the multi-endpoint service of an incoming communication when that incoming communication satisfies one or more of the override rules.

Figure 1:
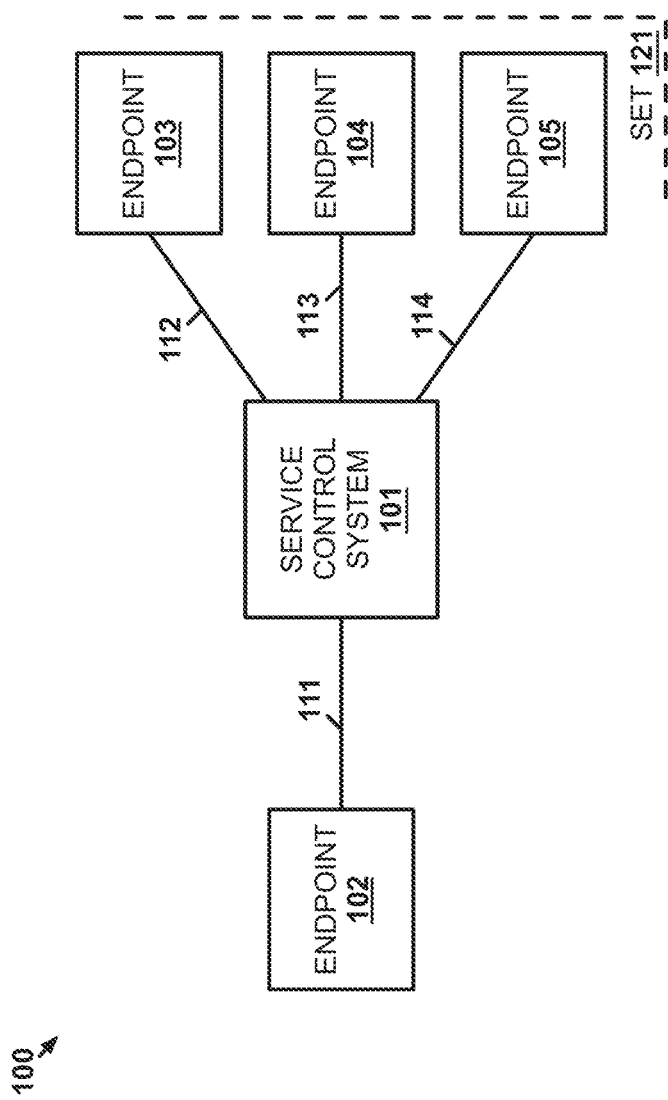
FIG. 1 illustrates an implementation for selectively notifying endpoints of an incoming communication.

FIG. 1 illustrates implementation 100 for selectively notifying endpoints of an incoming communication. Implementation 100 includes service control system 101 and endpoints 102-105. Service control system 101 and endpoints 102-105 communicate over communication links 111-114, respectively. Communication links 111-114 may comprise wireless and/or wired communication links and may include intervening communication networks, systems, and devices. Endpoints 102-105 may each comprise a wired phone, wireless phone, desktop workstation, laptop computer, tablet computer, or any other type of user system or device capable of being an endpoint for exchanging user communications on behalf of their respective users.

In operation, service control system 101 provides a multi-endpoint service to endpoints in endpoint set 121, which are endpoints 103-105 in this example. While not shown, service control system 101 may provide similar services to other endpoint sets and one or more of endpoints 103-105 may be included in one or more other endpoint sets as well. The multi-endpoint service is a service that, when not affected by override rules, notifies all of endpoints 103-105 about incoming communications directed to a destination identifier (e.g., phone number, communication handle, network address, etc.) associated with the service. Endpoints 103-105 may all correspond to the same user (e.g., when the multi-endpoint service is a multiple device access service) or two or more of endpoints 103-105 may correspond to different users (e.g., when the multi-endpoint service is a bridging service between team members). While endpoint set 121 includes three endpoints in this example, endpoint sets in other examples may include any number of two or more endpoints. When service control system 101 is provided with one or more override rules, as described in the examples below, those override rules may instruct service control system 101 to notify fewer than all of endpoints 103-105 (i.e., only one or two of endpoints 103-105 in this case) about an incoming communication. The override rules allow for notifications about certain incoming communications to be handled differently than those for other incoming communications rather than simply notifying all endpoints while the multi-endpoint service is active for endpoint set 121.

Figure 2:
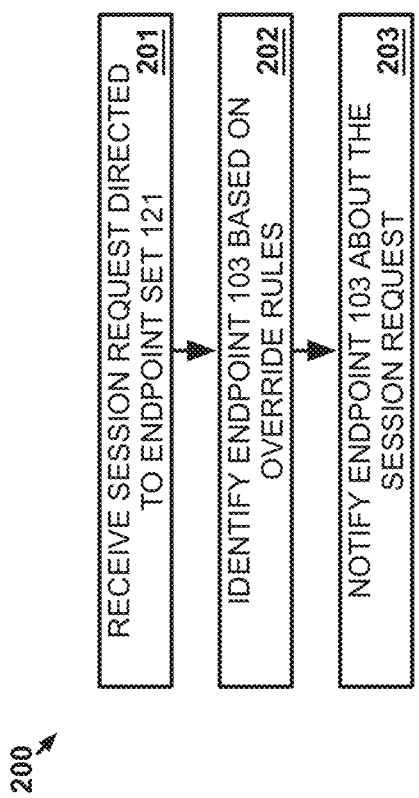
FIG. 2 illustrates an operational scenario to selectively notify endpoints of an incoming communication.

FIG. 2 illustrates operational scenario 200 to selectively notify endpoints of an incoming communication. In operational scenario 200, service control system 101 receives a request from endpoint 102 to establish a communication session with at least one endpoint of endpoint set 121 (201). The request may be a telephone call or may be a request to establish some other type of text, audio, and/or video communication session with an endpoint in endpoint set 121, such as a communication session for a communication protocol operating over the Internet Protocol (IP). The request is directed to endpoint set 121 in such a manner that the request is routed to service control system 101 and service control system 101 is able to determine that the request is directed to endpoint set 121. If service control system 101 only handles the multi-endpoint service for endpoint set 121, then the mere receipt of the request by service control system 101 may indicate that the request is directed towards endpoint set 121. In other examples, the request may explicitly indicate that it is directed to endpoint set 121, as opposed to another endpoint set or a specific endpoint. For example, the request may indicate a destination identifier associated with endpoint set 121, such as a phone number, communication handle, network address, or other type of identifier assigned to endpoint set 121. In some examples, an identifier associated with one of endpoints 103-105 may also indicate to service control system 101 that the request is actually being directed to endpoint set 121 (e.g., in a multi-device access scenario where endpoints 103-105 correspond to a single user, that user may direct service control system 101 to associate an identifier for one of endpoints 103-105 with endpoint set 121).

After receiving the request, service control system 101 identifies a subset of endpoint set 121 based on application of one or more override rules to the request (202). The override rules define conditions wherein fewer than all of endpoint set 121 should be notified of the request. An override rule may indicate one or more attributes of a request used to determine whether the request satisfies the rule and then indicate a subset of endpoint set 121 that should be notified about an incoming communication when the rule is satisfied. For example, one or more attributes provided by a rule may indicate an identifier of a source endpoint (e.g., phone number, handle, email address, etc.) for an request, a set of identifiers of one or more source endpoints, characteristics for a source identifier (e.g., area code, country code, domain name, etc.), a network address of a source endpoint (e.g., when the communication session is packet based), a time in which the request is received by service control system 101, a time in which the request was transferred from endpoint 102 (e.g., if endpoint 102 is in a different time zone from service control system 101), a type of communication session being requested (e.g., video, audio, text, etc.), or some other information descriptive of the communication request—including combinations thereof. An override rule may further define how override rule is satisfied based on the one or more attributes defined therein. For example, in some cases, an override rule may be satisfied when an request has the attribute (e.g., is from a particular phone number) while, in other cases, an attribute may be satisfied when the request does not have the attribute (e.g., is not from a phone number in a list of phone numbers). In further cases, both conventions may be used to satisfy an override rule that indicates multiple attributes (e.g., the rule may be satisfied when the request has one attribute but not another). In other examples, a default convention for satisfying the override rule may be used, which obviates the need for the override rule itself to indicate the convention. In those examples, an override rule will simply indicate the attribute(s) and the endpoint(s) that should be notified and service control system 101 will know how to apply the rule. Similarly, the override rule may indicate which endpoints should be notified by listing one or more endpoints of endpoint set 121 that should be notified or listing endpoints of endpoint set 121 that should not be notified.

An override rule may be received by service control system 101 at any time. An override rule may be received from one of endpoints 103-105 or may be received from some other user system. For example, a user of endpoint 104 may control endpoint 104 to indicate a desired override rule or may use a rule creation interface provided by a different user system (e.g., a client application for service control system 101 executing on a desktop computer workstation). In some examples, a user interface may provide a user with one or more default rule types for creation, which allows the user to simply select one of the default rules through the user interface. For instance, a button (either physical or graphical on a display) on an endpoint of endpoint set 121, when selected by a user during a communication session with endpoint 102, creates an override rule that directs service control system 101 to notify only the endpoint upon service control system 101 receiving a request for a subsequent communication session from endpoint 102. In other examples, a more comprehensive graphical user interface may be provided to a user that allows the user to create custom override rules by defining attributes and endpoints to be notified.

An override rule may further define when the override rule expires and service control system 101 should no longer apply the rule. For example, an override rule may indicate an amount of time until the override rule expires, a specific day/time in which the rule expires, a number of communication requests received by service control system 101 before the rule expires (e.g., the rule may apply only to the next incoming communication request), or some other metric that would trigger a rule to no longer be followed by service control system 101. In some examples, if an override rule itself does not define an expiration, service control system 101 may be configured to use a default expiration with respect to the override rule (e.g., service control system 101 may be configured to apply the rule until the following day). In other examples, an override rule may be effective indefinitely (e.g., until service control system 101 receives an instruction to no longer user the override rule).

Once service control system 101 has determined the subset of endpoint set 121 that should be notified of the request, service control system 101 notifies the subset about the request (203). In some examples, notifying the subset may include transferring communication session requests to each of the endpoints in the subset, which provides each endpoint in the subset with the opportunity to notify their respective users about the requests (e.g., generating a ringtone or vibration alert). The communication session requests may be sent using circuit switched signaling (e.g., Public Switched Telephone Network signaling), an IP-based signaling, such as Session Initiation Protocol (SIP), Web Real-Time Communications (WebRTC), or some other type of standardized or proprietary signaling protocol depending on how service control system 101 and endpoints 103-105 are configured to communicate. In some examples, the request received by service control system 101 from endpoint 102 may be in a different protocol than the request(s) transferred from service control system 101 to the subset (e.g., service control system 101 may act as a bridge between protocols/networks). Service control system 101 may then establish the requested communication session with whichever endpoint of the subset that responds to the request first (e.g., whichever endpoint's user answers the request first). In some examples, only a portion of the subset may receive a communication session request while others in the subset may simply be informed that the communication session request is incoming to the portion of the subset (e.g., allow endpoint 104 to answer the session request while merely informing endpoint 103 that endpoint 104 is receiving the session request). Informing an endpoint about the incoming request may be performed using a protocol the same as or similar to the one used by service control system 101 to transfer the communication session request(s) above or may use a different protocol, including standard messaging protocols such as email, instant messaging, Short Message Service (SMS), etc. When multiple endpoints are included in the subset, the override rules may further define which of the multiple endpoints receive which types of notifications (e.g., receive requests or are merely informed). Regardless, when the request is received by service control system 101 in the above example, rather than simply notifying all endpoints in endpoint set 121 of the request, as would happen without the override rules, the override rules instruct service control system 101 to notify fewer than all endpoints of endpoint set 121.

Figure 3:
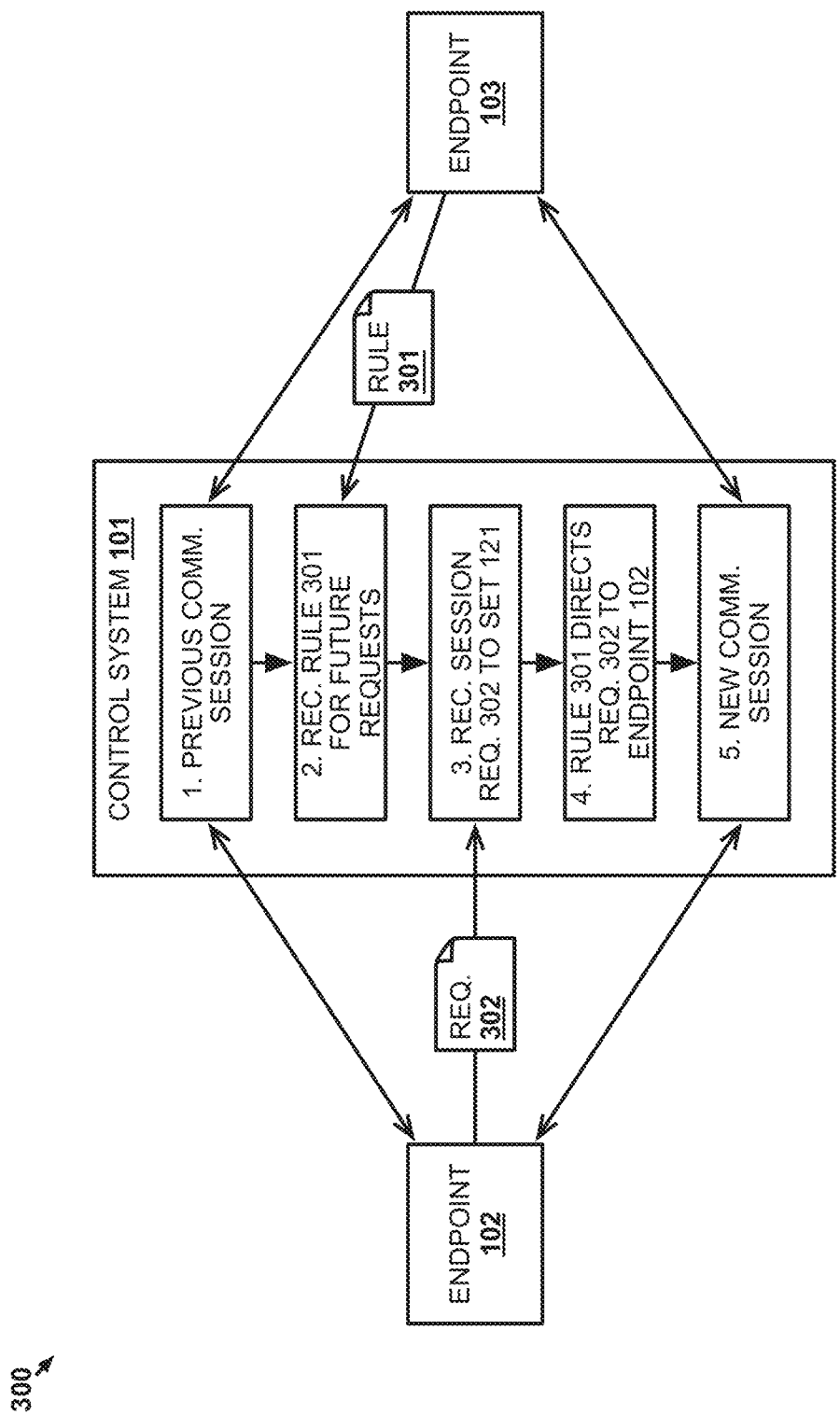
FIG. 3 illustrates another operational scenario to selectively notify endpoints of an incoming communication.

FIG. 3 illustrates operational scenario 300 to selectively notify endpoints of an incoming communication. Operational scenario 300 is a more specific example of what may occur when service control system 101 performs in accordance with the teachings of operational scenario 200. The example of operational scenario 300 involves service control system 101, endpoint 102, and endpoint 103 from implementation 100. In particular, at step 1, endpoint 102 and endpoint 103 are participating in a previous communication session whereby their respective users are exchanging user communications (e.g., voice/video) with each other over the communication session. The previous communication session may have been requested by endpoint 102 and, in response to the session request, service control system 101 may have notified all of endpoint set 121 with endpoint 103 having been the first endpoint in endpoint set 121 to respond to the notification (e.g., endpoint 103's user was the first user to answer).

During that previous communication session, service control system 101 receives override rule 301 at step 2 from endpoint 103. Override rule 301 in this case indicates that only endpoint 103 should be notified of future communications from endpoint 102 directed towards endpoint set 121. Override rule 301 may expire after the next communication session request is received and handled by service control system 101 or may define some other expiration. The user of endpoint 103 may have instructed endpoint 103 to create override rule 301 and transfer override rule 301 to service control system 101. For example, a user interface actuator (e.g., physical or software implemented button) on endpoint 103 may instruct endpoint 103 to create an override rule causing future call requests from the current opposing endpoint on a communication session (i.e., endpoint 102 in this example) to be routed directly to endpoint 103 instead of all endpoints in endpoint set 121. It should be understood that, while endpoint 103 creates override rule 301 in this example, endpoint 103 may instead provide service control system 101 with information necessary for service control system 101 to create the desired override rule 301 (e.g., the attributes and corresponding endpoints discussed above).

At a time after the previous communication session has ended between endpoint 102 and endpoint 103, service control system 101 receives communication session request 302 at step 3. Communication session request 302 is a request to establish a new communication session and is directed to endpoint set 121. For example, communication session request 302 may be directed to a phone number associated with endpoint set 121. Upon receiving communication session request 302, service control system 101 determines at step 4 that override rule 301 applies to communication session request 302 and that communication session request 302 should be directed to endpoint 103 rather than all endpoints in endpoint set 121. Presuming endpoint 103 responds to a session request notification from service control system 101 notifying endpoint 103 about communication session request 302, a new communication session is established between endpoint 102 and endpoint 103 so that their respective users can exchange user communications over the new communication session. It should be understood that, once established, the user communications for the communication sessions may be exchanged between endpoint 102 and endpoint 103 without passing through service control system 101, although operational scenario 300 includes service control system 101 as an intermediate system.

Figure 4:
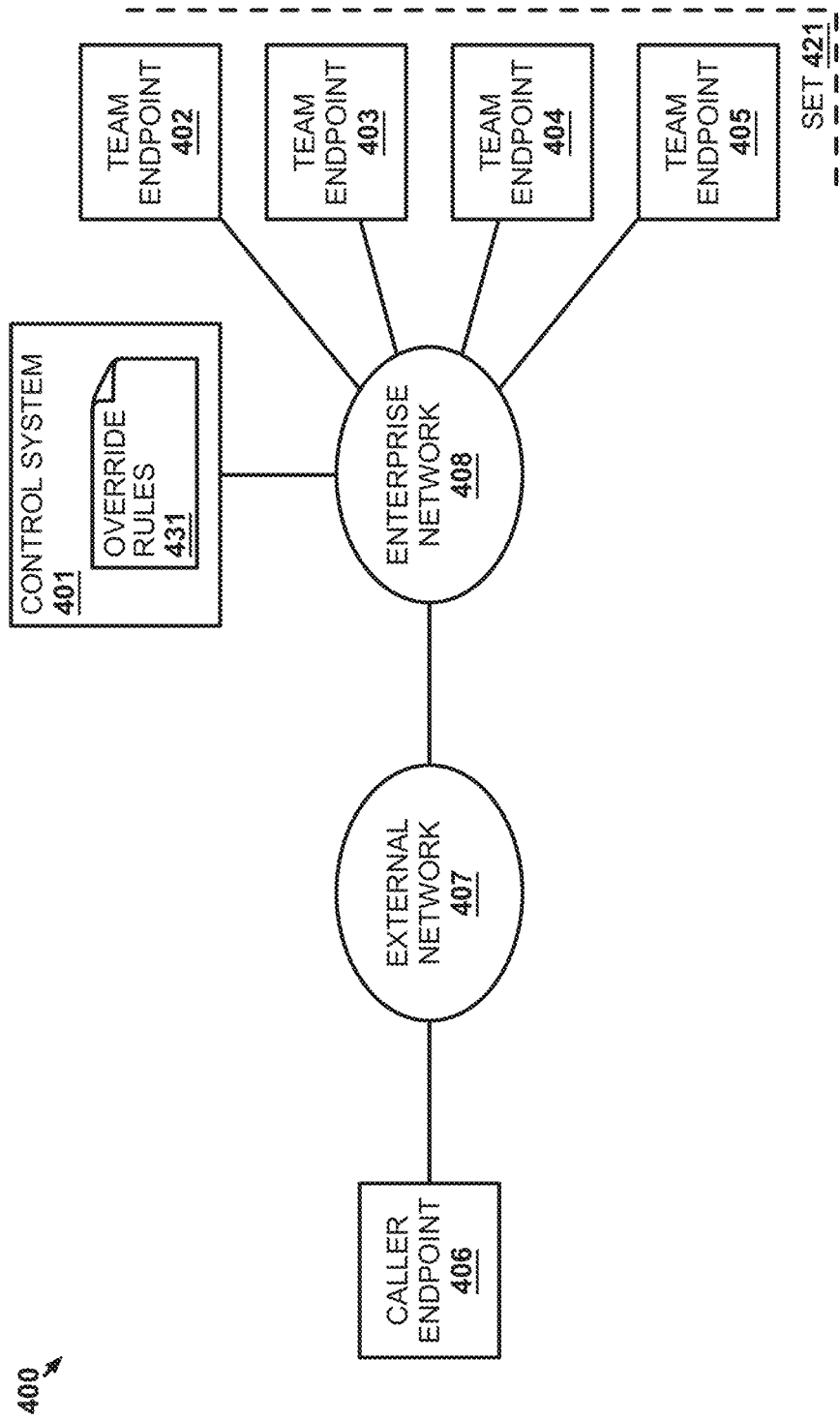
FIG. 4 illustrates another implementation for selectively notifying endpoints of an incoming communication.

FIG. 4 illustrates implementation 400 for selectively notifying endpoints of an incoming communication. Implementation 400 includes service control system 401, team endpoints 402-405, caller endpoint 406, external network 407, and enterprise network 408. Enterprise network 408 is a communication network associated with an enterprise (e.g., business) that employs a team of users that operate team endpoints 402-405 to handle communication sessions (voice calls in this example) received from outside of the enterprise. Enterprise network 408 connects to systems and devices outside of enterprise network 408 via external network 407, which includes one or more communication networks, such as the internet, that communication traffic may traverse between an endpoint external to enterprise network 408, such as caller endpoint 406, and enterprise network 408. In some examples, external network 407 may include different types of networks, such as circuit switched and packet-based networks. For instance, caller endpoint 406 may be on a Public Switched Telephone Network (PSTN) within external network 407 and a system within external network 407 may convert PSTN signaling to packet based signaling to communicate with enterprise network 408.

Team endpoints 402-405 are included in endpoint set 421 so that a phone number associated with endpoint set 421 can be dialed to direct a call to endpoint set 421. Calls directed to the phone number associated endpoint set 421 are routed to service control system 401 which recognizes the phone number as being associated with endpoint set 421. In the absence of an applicable override rule of override rules 431, service control system 401 notifies all of team endpoints 402-405 about the incoming call so that a team member at any of team endpoints 402-405 can answer the call. While only one set of endpoints is shown in implementation 400, the enterprise may have multiple teams operating endpoint sets that are associated with respective other phone numbers. Override rules 431 may, therefore, include override rules applicable to those respective endpoint sets in addition to those applicable to endpoint set 421, which are described in more detail below.

Team endpoints 402-405 may comprise computing devices, such a telephones or desktop workstations, that execute client applications that work with service control system 401 to provide a multi-endpoint service to user of team endpoints 402-405. A client application may be proprietary to the multi-endpoint service provided by service control system 401 or may be a client for a standardized protocol, such as a SIP or WebRTC client. In some examples, caller endpoint 406 may execute a similar client application for exchanging communications with service control system 401.

Figure 5:
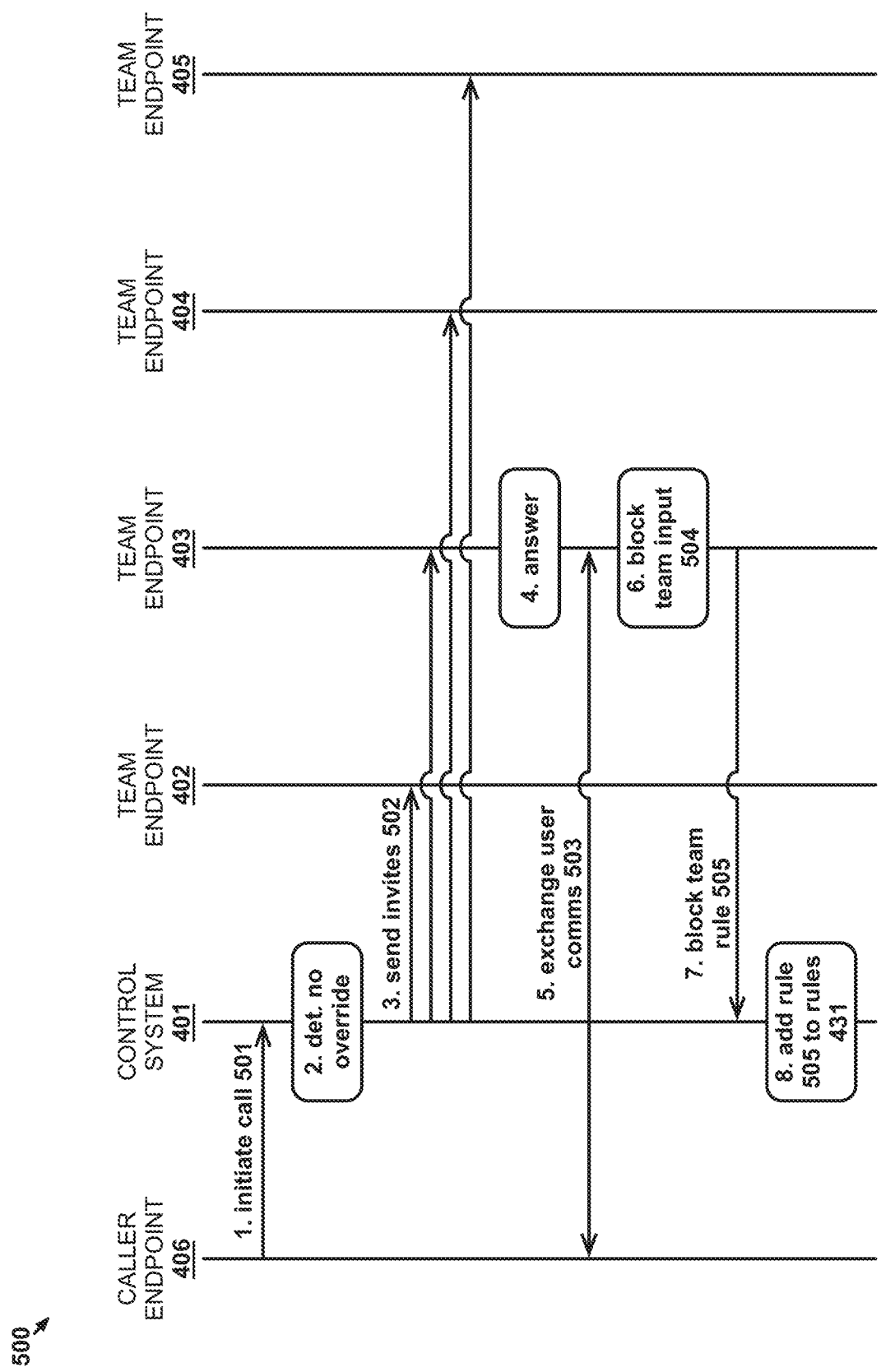
FIG. 5 illustrates an operational scenario to selectively notify endpoints of an incoming communication.

FIG. 5 illustrates operational scenario 500 to selectively notify endpoints of an incoming communication. In operational scenario 500, caller endpoint 406 initiates phone call 501 at step 1 to service control system 401. Initiation of phone call 501 represents a request to establish a phone call with one of team endpoints 402-405 in endpoint set 421. Phone call 501 is directed towards endpoint set 421 as a whole by being directed to a phone number associated with endpoint set 421. Phone calls directed to the phone number associated with endpoint set 421 are routed through external network 407 and enterprise network 408 to service control system 401. The phone call may be initiated over a circuit switch network or a packet switched network, although, in this example, a circuit switched phone call is converted to a packet-based format before it reaches enterprise network 408 and service control system 401.

Upon receiving the phone call from caller endpoint 406, service control system 401 determines at step 2 that no rules of override rules 431 are applicable to phone call 501. Since none of override rules 431 are applicable, service control system 401 handles the call in a default manner by sending call invites 502 at step 3 to each of team endpoints 402-405 in endpoint set 421 so that team endpoints 402-405 can notify their respective users of the incoming call. Call invites 502 are invites in a packet-based protocol, such as SIP, since service control system 401 and team endpoints 402-405 exchange packet-based communications over enterprise network 408. Although, in other examples, enterprise network 408 may be a circuit switched network between service control system 401 and team endpoints 402-405.

In this example, a user of team endpoint 403 directs team endpoint 403 to establish the call with caller endpoint 406 by at step 4 by answering the call notification (e.g., by picking up a handset of team endpoint 403, pressing an answer button on team endpoint 403, or otherwise). The call session for phone call 501 is then established between caller endpoint 406 and team endpoint 403 for the exchange of user communications 503 at step 5 for the respective users of caller endpoint 406 and team endpoint 403. As mentioned above, phone call 501 in this example is a voice call and user communications 503 are, therefore, voice communications.

At some point during the exchange of user communications 503, the user of team endpoint 403 determines that the user of caller endpoint 406 may need to call back. To best assist the user of caller endpoint 406, the user of team endpoint 403 determines that a subsequent call from caller endpoint 406 should be routed to team endpoint 403, specifically, rather than to all endpoints in endpoint set 421, as occurred at step 3. The user team endpoint 403 therefore provides user input 504 to team endpoint 403 at step 6 that directs team endpoint 403 to create an override rule 505 that blocks other team members from being notified of an incoming call from caller endpoint 406. In the context of the override rule attributes discussed above, the attribute for override rule 505 would indicate an identifier, such as a calling device phone number, for caller endpoint 406. Override rule 505 would then indicate team endpoint 403 as being the endpoint that should be notified using a call invite sent thereto. In this example, override rule 505 also indicates that team endpoint 405 should also be notified of an incoming call from caller endpoint 406. The notification to team endpoint 405 is not a call invite that will allow the user of team endpoint 405 to answer the call but, instead, is a notification that the call invite for a call with caller endpoint 406 is being sent to team endpoint 403. For example, the user of team endpoint 405 may be a supervisor of the user of team endpoint 403. The supervisor may want to be notified when call invites are sent to a specific one of team endpoints 402-405. Thus, override rule 505 further accounts for notifying team endpoint 405.

In some examples, service control system 401 may maintain permissions that indicate which users/endpoints are allowed to create override rules and/or impose requirements/limits on the override rule parameters that can be created by particular users/endpoints. For instance, the user of team endpoint 402 may be a new employee and the supervisor does not want that new employee to create override rules. Thus, the supervisor may adjust the permissions used by service control system 401 to not accept override rules from an endpoint operated by the new employee (i.e., team endpoint 402 in this example). In an alternative example, the permissions may require particular users/endpoints to not exclude the supervisor when creating an override rule.

Override rule 505 is sent at step 7 to service control system 401 after team endpoint 403 receives user input 504. Override rule 505 may be sent via an out of band connection over enterprise network 408 between service control system 401 and team endpoint 403, may be sent in signaling for the call session between caller endpoint 406 and team endpoint 403, or may be sent in some other manner. Upon service control system 401 receiving override rule 505, service control system 401 adds override rule 505 at step 8 to override rules 431. Once added to override rules 431, service control system 401 can apply override rule 505 to subsequent incoming calls received by service control system 401, as discussed in the example below.

Figure 6:
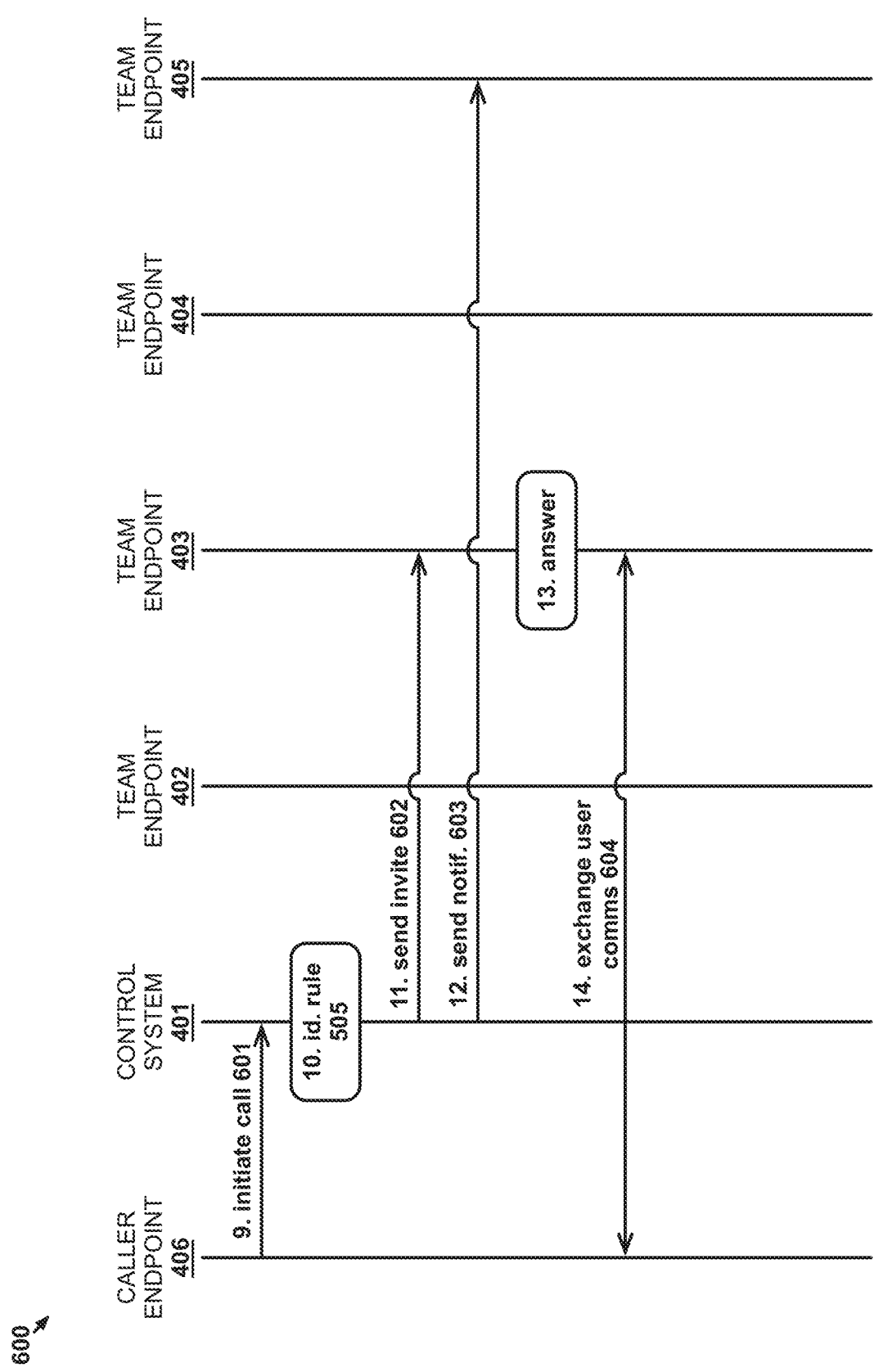
FIG. 6 illustrates another operational scenario to selectively notify endpoints of an incoming communication.

FIG. 6 illustrates operational scenario 600 to selectively notify endpoints of an incoming communication. Operational scenario 600 is a continuation of operational scenario 500 after override rule 505 is added to override rules 431 and after phone call 501 is ended between caller endpoint 406 and team endpoint 403. In operational scenario 600, caller endpoint 406 initiates phone call 601 at step 9 to service control system 401. Phone call 601, like phone call 501 before it, represents a request to establish a phone call with one of team endpoints 402-405 in endpoint set 421. Also, like phone call 501, phone call 601 is directed towards endpoint set 421 by being directed to a phone number associated with endpoint set 421.

In this example, upon receiving the request for phone call 601, service control system 401 identifies override rule 505 within override rules 431 at step 10 as being an override rule that applies to phone call 601. In particular, service control system 401 compares the attribute(s) of override rule 505 to determine whether override rule 505 applies request for phone call 601. As discussed above, override rule 505 includes one or more attributes, such as an identifier of caller endpoint 406, that identify calls requested from caller endpoint 406. Thus, service control system 401 determines during the comparison that attributes of phone call 601 match the attributes required by override rule 505. Once service control system 401 determines that override rule 505 applies to phone call 601, service control system 401 determines which of team endpoints 402-405 should be notified about phone call 601. In this example, service control system 401 determines that override rule 505 indicates that team endpoint 403 should be notified about phone call 601 via a call invite while team endpoint 405 should be notified about phone call 601 by being informed about phone call 601 without receiving a call invite.

In accordance with override rule 505, service control system 401 transfers call invite 602 at step 11 to team endpoint 403 and call notification 603 at step 12 to team endpoint 405. While shown as being sent one after the other, it should be understood that call invite 602 and call notification 603 may be transferred in any order and, preferably, at substantially the same time to ensure both team endpoint 403 and team endpoint 405 are notified of phone call 601 as soon as possible. Call invite 602 is an invite like one of call invites 502. Call notification 603 is a notification of a type other than a call invite. That is, while team endpoint 405 may be able to notify its user about phone call 601 being transferred to team endpoint 403, team endpoint 405 will not be able to answer the phone call 601 in response to call notification 603. For example, in response to receiving call notification 603, a client application on team endpoint 405 may display a notification to its user with information about phone call 601 (e.g., information indicating that a call from caller endpoint 406 is being routed to team endpoint 403). Other types of notifications, such as email, text message, etc., may also be used.

In response to receiving call invite 602, team endpoint 403 notifies its user that phone call 601 is incoming. For example, team endpoint 403 may ring, vibrate, display information (e.g., that a call is incoming from caller endpoint 406), or communicate that a call is incoming in some other manner—including combinations thereof. In this example, the user of team endpoint 403 answers the call via team endpoint 403 at step 13, which causes team endpoint 403 to respond to call invite 602 and establish a call session with caller endpoint 406 for phone call 601. Over the call session, user communications 604 are exchanged at step 14 between caller endpoint 406 and team endpoint 403 for the respective users of caller endpoint 406 and team endpoint 403. As with phone call 501, phone call 601 is a voice call in this example and user communications 604 are, therefore, voice communications. After being used to route phone call 601, override rule 505 may expire or service control system 401 may continue to use override rule 505 for a period of time, either as defined by override rule 505 itself or predefined within service control system 401.

The above examples focus on an incoming call from caller endpoint 406, although, service control system 401 may also be configured to notify other endpoints when a communication is outgoing. For instance, service control system 401 may receive an outgoing communication request from team endpoint 403 directed to caller endpoint 406 from endpoint set 421 (e.g., from a phone number associated with endpoint set 421). Upon receiving the request and determining that none of override rules 431 apply, service control system 401 may notify the other endpoints in endpoint set 421 that team endpoint 404 is requesting a communication session with caller endpoint 406 in addition to requesting the communication with caller endpoint 406 on behalf of endpoint set 421. The notification may be similar to call notification 603 and simply provide information about the outgoing communication to the other team endpoints, although, in some cases, an invite similar to call invite 602 may be sent to allow other team endpoints to join the outgoing communication session. An override rule may be created to override the default notification behavior of service control system 401. For example, an override rule may have been created that indicates that no notifications should be sent to other team endpoints of endpoint set 421 by service control system 401 when team endpoint 403 requests a call with caller endpoint 406 on behalf of endpoint set 421.

Figure 7:
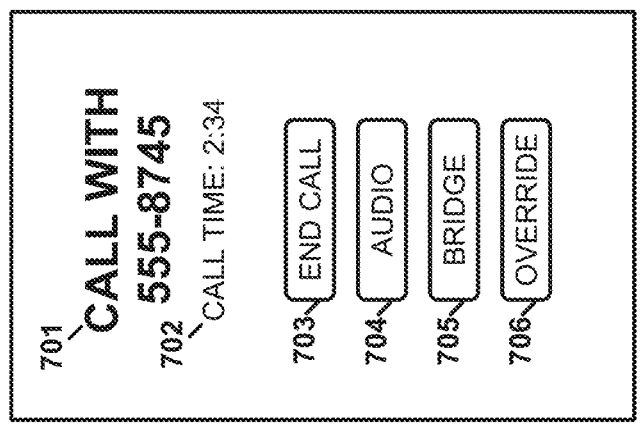
FIG. 7 illustrates a user interface for selectively notifying endpoints of an incoming communication.

FIG. 7 illustrates user interface 700 for selectively notifying endpoints of an incoming communication. User interface 700 is an example of what may be displayed by a display of one of team endpoints 402-405 during a call with a caller endpoint, such as caller endpoint 406. User interface 700 may be displayed at the instruction of a client application executing on the team endpoint to access services of service control system 401. Other arrangements of a user interface, including those without a display, may be used in other examples. User interface 700 displays a call identification graphic 701, an elapsed call time graphic 702, an end call button 703, an audio output button 704, a bridge button 705, and an override rule button 706. Call identification graphic 701 indicates that the current call is with an endpoint having the phone number 555-8745, although, other examples may, for instance, indicate a name of a caller and/or other information about the caller. Elapsed call time graphic 702 indicates how much time has elapsed since the call began, which is 2 minutes and 34 seconds at the moment captured in user interface 700. End call button 703, when pressed by a user, ends the call with 555-8745. Audio output button 704, when pressed by a user, allows the user to indicate which audio output should be used for the call (e.g., a handset of the endpoint of user interface 700, a speakerphone interface of the endpoint, a wireless headset, etc.). Bridge button 705, when pressed by a user, allows the user to indicate one or more other endpoints that the user wants bridged onto the call. Override rule button 706, when pressed by a user, displays a menu for creating an override rule for service control system 401 to include in override rules 431.

Figure 8:
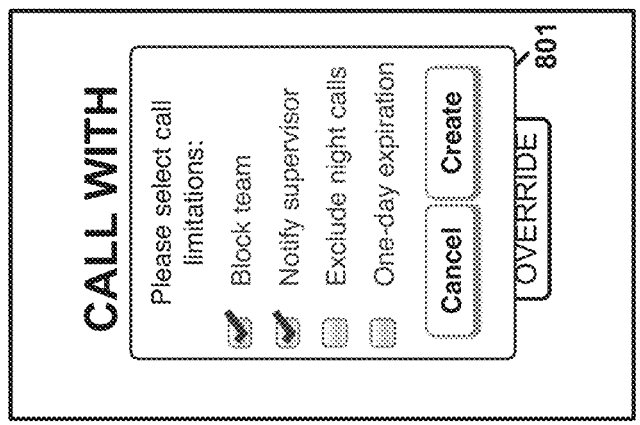
FIG. 8 illustrates another user interface for selectively notifying endpoints of an incoming communication.

FIG. 8 illustrates user interface 800 for selectively notifying endpoints of an incoming communication. User interface 800 is an example of user interface 700 after a user has pressed override rule button 706. In particular, after the user presses override rule button 706, rule creation window 801 is displayed in user interface 800. Rule creation window 801 provides the user with predefined options for creating an override rule. The options in this case include an option to block the rest of the team from being notified about calls from 555-8745 (i.e., "block team" option), an option to notify the user's supervisor (i.e., "notify supervisor" option), an option to exclude nighttime calls from the rule (i.e., "exclude night calls" option), and an option that causes the rule to expire after one day (i.e., "one-day expiration" option). These predefined options allow the user to simply check each option that the user wants as part of the override rule's definition. Permissions maintained by service control system 401 may govern which options are included in rule creation window 801. Since rule creation window 801 does not include a space for the user to indicate an identifier for an incoming call (e.g. a phone number of a calling endpoint), the user will infer that the override rule will use the phone number of the current call (i.e., 555-8745) as the identifier. Other examples may allow the user to input one or more caller identifiers manually.

In this example, the user has selected the block team and notify supervisor options by checking the boxes next to the respective options. These two options will create a rule similar to override rule 505 where subsequent calls received by service control system 401 from 555-8745 will be routed to the endpoint of user interface 800 with a call invite while also notifying the supervisor of the call. Presumably, either service control system 401 or the endpoint of user interface 800 is aware of the supervisor's endpoint such that the user does not need to specifically identify the supervisor's endpoint in this example. Once the user presses the "create" button in rule creation window 801 the desired override rule is sent to service control system 401 for inclusion in override rules 431. Alternatively, if the user decides not to create a rule, the user can press the "cancel" button in rule creation window 801 and rule creation window 801 will close. Since the user in this example, did not select the "one-day expiration" option, the override rule may be implemented for an indefinite amount of time or service control system 401 may use a default expiration (e.g., one week).

It should be understood that the above user interfaces 700 and 800 are merely examples of how a user may be able to quickly create an override rule while on a call. Other example user interfaces may provide a user with more or fewer options for creating the rule than user interface 800. In one example, override rule button 706 may simply implement an override rule with the "block team" option for calls from 555-8745 without displaying additional options like those in rule creation window 801. Alternatively, some user interfaces may allow a user to manually enter attributes/endpoints instead of, or in addition to, using predefined options. In some examples, the user may not need to be on a call to create an override rule. For example, a user of team endpoint 404 may be corresponding via email with a user of caller endpoint 406. If the user of caller endpoint 406 indicates they will be calling soon, then the user of team endpoint 404 may provide input to team endpoint 404 that preemptively creates an override rule to route a call from caller endpoint 406 to team endpoint 404 (e.g., indicates that a call from the phone number of caller endpoint 406 should be directed to team endpoint 404). In other examples, a user interface may allow a user to view, edit, and/or delete override rules that have already been created. In those examples, a user may be able to access only override rules created by the user or may be able to access override rules created by one or more other users.

In the example of user interfaces 700 and 800, the user of the endpoint having those interfaces creates a rule to route an incoming call to themselves (i.e., to their endpoint). In other examples, the user may be allowed to create an override rule that routes the call to one or more other endpoints. For example, the user may determine that another user on their team would be able to better handle the next steps in an issue presented by a caller. The user may then create an override rule to route future calls from the caller to that other user.

Figure 9:
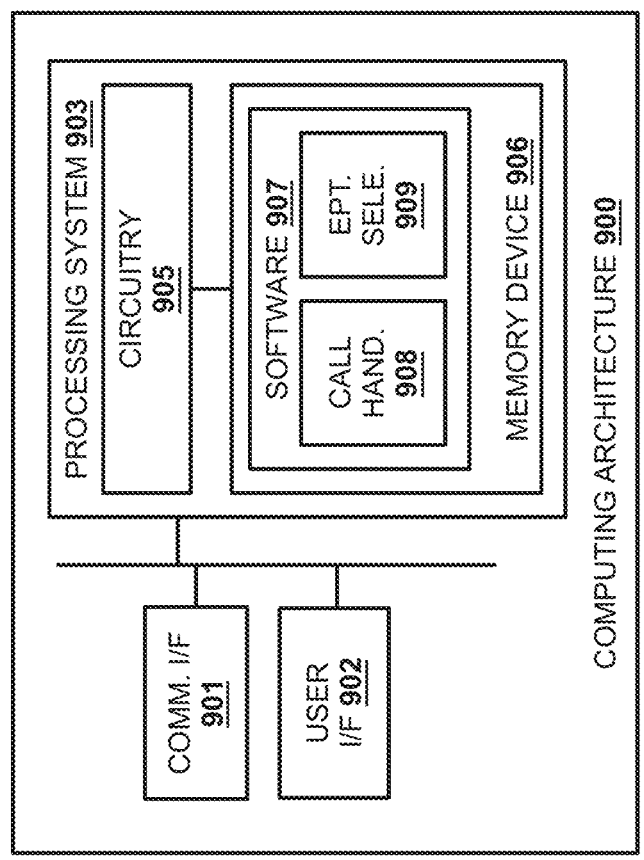
FIG. 9 illustrates a computing architecture for selectively notifying endpoints of an incoming communication.

FIG. 9 illustrates computing architecture 900 for selectively notifying endpoints of an incoming communication. Computing architecture 900 is an example computing architecture for service control system 101 and service control system 401, although systems 101 and 401 may use alternative configurations. A similar architecture may also be used for other systems described herein, although alternative configurations may also be used. Computing architecture 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof.

User interface 902 comprises components that interact with a user. User interface 902 may include a keyboard, display screen, mouse, touch pad, or some other user input/output apparatus. User interface 902 may be omitted in some examples.

Processing circuitry 905 comprises microprocessor and other circuitry that retrieves and executes operating software 907 from memory device 906. Memory device 906 comprises a computer readable storage medium, such as a disk drive, flash drive, data storage circuitry, or some other memory apparatus. In no examples would a storage medium of memory device 906 be considered a propagated signal. Operating software 907 comprises computer programs, firmware, or some other form of machine-readable processing instructions. Operating software 907 includes call handler module 908 and endpoint selection module 909. Operating software 907 may further include an operating system, utilities, drivers, network interfaces, applications, or some other type of software. When executed by processing circuitry 905, operating software 907 directs processing system 903 to operate computing architecture 900 as described herein.

In particular, call handler module 908 directs processing system 903 to receive a first request to establish a communication session with at least one endpoint in first set of endpoints. The first set of endpoints comprises two or more endpoints and the request is directed to the first set of endpoints. Endpoint selection module 909 directs processing system to identify a first subset of the first set of endpoints based on application of one or more override rules to the first request. The override rules define conditions wherein fewer than all of the first set of endpoints should be notified of the first request. Call handler module 908 further directs processing system 903 to notify the first subset about the first request.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for selectively notifying endpoints about a communication session request, the method comprising:

in a service control system, receiving a first request to establish a communication session with at least one endpoint in first set of endpoints, wherein the first set of endpoints comprises two or more endpoints, and wherein the first request is directed to the first set of endpoints;

determining whether the first request satisfies one or more override rules of a plurality of override rules, wherein satisfaction of at least one of the plurality of override rules overrides the service control system from notifying all of the first set of endpoints about the first request and instructs the service control system to notify fewer than all of the first set of endpoints instead;

after determining that the first request satisfies the one or more override rules, identifying a first subset of the first set of endpoints based on the one or more override rules, wherein the first subset includes fewer than all of the first set of endpoints; and notifying the first subset about the first request instead of notifying all of the first set of endpoints.

2. The method of claim 1, further comprising:
establishing the communication session with a first endpoint in the first subset after notifying the first subset.

3. The method of claim 1, wherein notifying the first subset comprises:
transferring a communication session invite to each endpoint in the first subset.

4. The method of claim 3, wherein, in response to receiving the communication session invite, a first endpoint in the first subset notifies a first user of the first endpoint about the communication session invite.

5. The method of claim 1, further comprising:
receiving at least a portion of the plurality of override rules from a first user.

6. The method of claim 5, wherein the first user is a user of a first endpoint in the first set of endpoints.

7. The method of claim 6, wherein the first endpoint provides the first user with one or more predefined rule options, and wherein the first user selects at least one of the predefined rule options.

8. The method of claim 1, wherein a first rule of the one or more override rules indicates that requests from a source endpoint of the first request should be directed to a first endpoint in the first set of endpoints, and wherein identifying the first subset comprises:
including the first endpoint in the first subset.

9. The method of claim 8, wherein the source endpoint is identified in the one or more override rules based on a telephone number associated with the source endpoint.

10. The method of claim 1, wherein notifying the first subset comprises:
transferring a communication session invite to a first endpoint in the first subset; and
notifying endpoints in the first subset, other than the first endpoint, that the communication session invite is being transferred to the first endpoint.

11. An apparatus for selectively notifying endpoints about a communication session request, the apparatus comprising:
one or more computer readable storage media;
a processing system operatively coupled with the one or more computer readable storage media; and
program instructions stored on the one or more computer readable storage media that, when read and executed by the processing system, direct the processing system to:
receive a first request to establish a communication session with at least one endpoint in first set of endpoints, wherein the first set of endpoints comprises two or more endpoints, and wherein the request is directed to the first set of endpoints;
determine whether the first request satisfies one or more override rules of a plurality of override rules, wherein satisfaction of at least one of the plurality of override rules overrides the apparatus from notifying all of the first set of endpoints about the first request and instructs the apparatus to notify fewer than all of the first set of endpoints instead;
after determining that the first request satisfies the one or more override rules, identify a first subset of the first set of endpoints based on the one or more override rules, wherein the first subset includes fewer than all of the first set of endpoints; and notify the first subset about the first request instead of notifying all of the first set of endpoints.

12. The apparatus of claim 11, wherein the program instructions further direct the processing system to:

establish the communication session with a first endpoint in the first subset after notifying the first subset.

13. The apparatus of claim 11, wherein to notify the first subset, the program instructions direct the processing system to:

transfer a communication session invite to each endpoint in the first subset.

14. The apparatus of claim 13, wherein, in response to receiving the communication session invite, a first endpoint in the first subset notifies a first user of the first endpoint about the communication session invite.

15. The apparatus of claim 11, wherein the program instructions further direct the processing system to:

receive at least a portion of the plurality of override rules from a first user.

16. The apparatus of claim 15, wherein the first user is a user of a first endpoint in the first set of endpoints.

17. The apparatus of claim 16, wherein the first endpoint provides the first user with one or more predefined rule options, and wherein the first user selects at least one of the predefined rule options.

18. The apparatus of claim 11, wherein a first rule of the one or more override rules indicates that requests from a source endpoint of the first request should be directed to a first endpoint in the first set of endpoints, and wherein to identify the first subset, the program instructions direct the processing system to:

include the first endpoint in the first subset.

19. The apparatus of claim 18, wherein the source endpoint is identified in the one or more override rules based on a telephone number associated with the source endpoint.

20. An apparatus for selectively notifying endpoints about a communication session request, the apparatus comprising:

one or more computer readable storage media having program instructions stored thereon for selectively notifying endpoints about a communication session request, the program instructions, when read and executed by a processing system, direct the processing system to:

receive a first request to establish a communication session with at least one endpoint in first set of endpoints, wherein the first set of endpoints comprises two or more endpoints, and wherein the request is directed to the first set of endpoints;

determine whether the first request satisfies one or more override rules of a plurality of override rules, wherein satisfaction of at least one of the plurality of override rules overrides the apparatus from notifying all of the first set of endpoints about the first request and instructs the apparatus to notify fewer than all of the first set of endpoints instead;

after determining that the first request satisfies the one or more override rules, identify a first subset of the first set of endpoints based on the one or more override rules, wherein the first subset includes fewer than all of the first set of endpoints; and notify the first subset about the first request instead of notifying all of the first set of endpoints.

* * * * *